United States Patent
Millich et al.

(10) Patent No.: US 10,774,757 B2
(45) Date of Patent: Sep. 15, 2020

(54) METHOD AND CONTROLLER FOR DETERMINING THE QUANTITY OF FILLING COMPONENTS IN A CYLINDER OF AN INTERNAL COMBUSTION ENGINE

(71) Applicant: VOLKSWAGEN AKTIENGESELLSCHAFT, Wolfsburg (DE)

(72) Inventors: Elmar Millich, Berlin (DE); Lars Petersen, Meinersen (DE); René Kleinhans, Warenholz (DE); Andre Shurkewitsch, Calberlah (DE); Jean-Sebastian Tempel, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 178 days.

(21) Appl. No.: 16/134,036

(22) Filed: Sep. 18, 2018

(65) Prior Publication Data
US 2019/0017450 A1    Jan. 17, 2019

Related U.S. Application Data

(63) Continuation of application No. PCT/EP2017/052494, filed on Feb. 6, 2017.

(30) Foreign Application Priority Data

Mar. 18, 2016 (DE) .................. 10 2016 204 539

(51) Int. Cl.
*G01M 15/08* (2006.01)
*F02D 35/02* (2006.01)
(Continued)

(52) U.S. Cl.
CPC ........... *F02D 35/024* (2013.01); *F02D 35/02* (2013.01); *F02D 41/0062* (2013.01);
(Continued)

(58) Field of Classification Search
CPC ............................. G01M 15/05; G01M 15/08
(Continued)

(56) References Cited

U.S. PATENT DOCUMENTS

| 6,728,624 B2 | 4/2004 | Palazzi et al. |
| 7,357,127 B2 | 4/2008 | Dingl et al. |

(Continued)

FOREIGN PATENT DOCUMENTS

| DE | 19740914 A1 | 10/1998 |
| DE | 10213138 A1 | 5/2003 |

(Continued)

OTHER PUBLICATIONS

International Search Report dated Apr. 24, 2017 in corresponding application PCT/EP2017/052494.

*Primary Examiner* — Eric S. McCall
(74) *Attorney, Agent, or Firm* — Muncy, Geissler, Olds & Lowe, P.C.

(57) ABSTRACT

A method for determining the quantity of filling components in a cylinder of an internal combustion engine. The cylinder is connected to an air supply via an inlet valve and to an exhaust gas conduit via an outlet valve. The method includes the steps of obtaining an exhaust gas back pressure at a specified point in time when the outlet valve is opened during a work cycle of the internal combustion engine and calculating the quantity of the filling components at the specified point in time on the basis of the obtained exhaust gas back pressure. A controller is also provided for carrying out the method and a motor vehicle is also provided that includes the controller.

8 Claims, 2 Drawing Sheets

(51) Int. Cl.
  *F02D 41/00*     (2006.01)
  *F02D 41/14*     (2006.01)
  *G01M 15/10*     (2006.01)

(52) U.S. Cl.
  CPC ....... *F02D 41/1448* (2013.01); *G01M 15/106* (2013.01); *F02D 2200/024* (2013.01); *F02D 2200/0411* (2013.01); *Y02T 10/47* (2013.01)

(58) Field of Classification Search
  USPC .............................. 73/114.31, 114.33, 114.76
  See application file for complete search history.

(56) References Cited

U.S. PATENT DOCUMENTS

| | | |
|---|---|---|
| 7,359,791 B2 | 4/2008 | Borean et al. |
| 8,977,470 B2 | 3/2015 | Leone et al. |
| 2003/0105575 A1 | 6/2003 | Haskara et al. |
| 2014/0007855 A1 | 1/2014 | Kosaka et al. |
| 2014/0020656 A1 | 1/2014 | Kosaka et al. |
| 2014/0230780 A1 | 8/2014 | Larimore et al. |
| 2015/0136080 A1 | 5/2015 | Surnilla |

FOREIGN PATENT DOCUMENTS

| | | |
|---|---|---|
| DE | 102004030604 B3 | 2/2006 |
| DE | 102005055952 A1 | 5/2007 |
| DE | 102006032366 A1 | 1/2008 |
| EP | 1231372 A2 | 8/2002 |
| EP | 1830056 A1 | 9/2007 |
| EP | 2708726 A1 | 3/2014 |

METHOD AND CONTROLLER FOR DETERMINING THE QUANTITY OF FILLING COMPONENTS IN A CYLINDER OF AN INTERNAL COMBUSTION ENGINE

This nonprovisional application is a continuation of International Application No. PCT/EP2017/052494, which was filed on Feb. 6, 2017, and which claims priority to German Patent Application No. 10 2016 204 539.3, which was filed in Germany on Mar. 18, 2016, and which are both herein incorporated by reference.

BACKGROUND OF THE INVENTION

Field of the Invention

The invention relates to a method and a controller for determining a quantity of a charge component in a cylinder of an internal combustion engine, in particular for determining a residual gas quantity in a cylinder of an internal combustion engine of a motor vehicle. In addition, the invention relates to a motor vehicle with such a controller.

Description of the Background Art

In operating gasoline engines, the most precise possible measurement of the current cylinder air charge plays a central role in order to deliver the fuel mass by injection as exactly as possible in the stoichiometric ratio so that a lambda value takes on the value one, thus minimizing pollutant emissions. In the case of diesel engines, precise determination of the cylinder charge is likewise increasingly important on account of emission control legislation. Thus, the cylinder air charge is generally calculated in the engine control unit from a measured or modeled intake manifold pressure, a measured or modeled exhaust gas back pressure, and models for the residual gas content in the cylinder. In addition, the calculation of the cylinder air charge incorporates the current positions of actuators that affect the charge, for example the positions of the intake and exhaust camshafts, the swirl flaps, the valve strokes, and other positions, as well as intake air and exhaust gas temperatures. Another important parameter in calculating the current cylinder charge is the exhaust gas back pressure directly after the exhaust valves, since this has a major influence on the residual gas rate in the combustion chamber. In this context, the exhaust gas back pressure averaged over a segment of an operating cycle is typically considered in the case of sensor-based methods.

If a supercharged gasoline engine is operated at operating points with camshaft overlap, then the exhaust gas back pressure is subject to sharp variations that depend on camshaft angle. In particular, at low to midrange speeds the use of the averaged exhaust gas back pressure can result in erroneous calculations of the cylinder air charge. Parameterized models for the relationship between cylinder air charge and averaged exhaust gas back pressure exhibit extremely nonlinear behavior in some operating regions, which can result in considerable inaccuracies, most notably in view of sensor tolerances.

DE 10 2006 032 366 A1 describes a method for determining a fresh air mass in a cylinder on the basis of an exhaust gas quantity, wherein the exhaust gas quantity is determined from a ratio of an exhaust gas pressure before and after an aperture arranged in an exhaust gas passage behind an exhaust valve of the cylinder. The fresh air mass is then determined from the exhaust gas quantity. The accuracy of the determination of the fresh air mass is, however, impaired at operating points with camshaft overlap.

SUMMARY OF THE INVENTION

It is therefore an object of the present invention to provide a method and a controller for determining a quantity of a charge component in a cylinder of an internal combustion engine that at least partially overcome the above-mentioned disadvantages.

According to an exemplary embodiment of the invention, a method for determining a quantity of a charge component in a cylinder of an internal combustion engine is provided, wherein the cylinder is connected by an intake valve to an air inlet and by an exhaust valve to an exhaust duct. An exhaust gas back pressure is obtained at a predetermined point in time during an operating cycle of the internal combustion engine when the exhaust valve is open. The quantity of the charge component is calculated at the predetermined point in time on the basis of the exhaust gas back pressure obtained.

A controller is also provided for determining a quantity of a charge component in a cylinder of an internal combustion engine, wherein the controller is designed to carry out a method for determining a quantity of a charge component in a cylinder according to the invention.

The present invention relates to a method for determining a quantity of a charge component, for example a residual gas quantity, in a cylinder of an internal combustion engine, in particular an internal combustion engine of a motor vehicle. The internal combustion engine is designed such that the cylinder is connected by an intake valve to an air inlet, in particular an intake manifold, and by an exhaust valve to an exhaust duct, in particular an exhaust manifold. The internal combustion engine can be a gasoline engine or a diesel engine.

An exhaust gas back pressure is received at a predetermined point in time during an operating cycle of the internal combustion engine when the exhaust valve is open, in particular partially or fully open, and the quantity of the charge component at the predetermined point in time is calculated on the basis of the exhaust gas back pressure obtained. The exhaust gas back pressure at the predetermined point in time can be measured in the exhaust duct, preferably adjacent to the exhaust valve, by an exhaust back pressure sensor, or can be calculated, for example on the basis of multiple measured values that are measured during the operating cycle.

A quantity of the charge component, and hence the cylinder charge as a whole, can be determined very exactly.

The operating cycle (which can also be referred to as a working cycle) can comprise the steps intake, compression, power, exhaust. In a four-stroke engine, for example, one operating cycle of the internal combustion engine extends over two crankshaft rotations.

The predetermined point in time during the operating cycle of the internal combustion engine can be a point in time when the intake valve is open. The predetermined point in time can thus be a point in time during a valve overlap (also referred to as camshaft overlap). During the valve overlap, preferably both the intake valve and the exhaust valve are open. A valve overlap can be provided during exhaust and/or during intake, for example.

At the predetermined point in time when the intake valve is open, the intake valve can be partially or fully open. Preferably, a valve lift of the intake valve at the predetermined point in time can be 0.1 mm or more, in particular in the range of 0.2 mm to 0.5 mm, or greater.

The predetermined point in time can be, for example, the point in time when the valve lift of the intake valve is between 0.2 mm and 0.5 mm and the exhaust valve is at least partially open. Alternatively, the intake valve can be at least partially open and a valve lift of the exhaust valve can be between 0.2 mm and 0.5 mm. As a further alternative, the predetermined point in time can be between a point in time when the intake valve opens and a point in time when the exhaust valve closes, in particular can be midway between these two points in time.

The exhaust gas back pressure at the predetermined point in time can be measured or can be calculated on the basis of measured data. The measured data can be measured at different points in time during the one operating cycle when both the intake valve and the exhaust valve can be at least partially open, and the exhaust gas back pressure can be calculated by forming an average, for example.

Because the exhaust gas back pressure during the valve overlap, and not the averaged pressure curves, is critical for the cylinder air charge of the cylinder as well as for the quantity of the charge component, the method described makes possible a very exact calculation of the cylinder air charge at operating points with high camshaft overlap and at high exhaust gas back pressures. However, a very exact calculation of the cylinder air charge and of the residual gas mass is also possible for other operating points that exhibit a smaller camshaft overlap or even none.

The quantity of the charge component can include a residual gas quantity, in particular a residual gas mass, a fresh air quantity, in particular a fresh air mass, and/or a scavenging air quantity, in particular a scavenging air mass. The residual gas quantity is preferably a quantity of exhaust gas that remains in the cylinder during exhausting. The fresh air quantity is preferably a quantity of fresh air that arrives in the cylinder during intake, and remains therein. The scavenging air quantity is preferably a quantity of fresh air that arrives in the cylinder during intake during the valve overlap and exits it again through the exhaust valve.

Because the exhaust gas back pressure during the valve overlap influences the extent of, in particular, a residual-gas overflow or residual-gas exhaustion, it is possible to determine the residual gas quantity, in particular the residual gas mass, especially accurately with the method described.

There may be a predetermined relationship between the exhaust gas back pressure at the predetermined point in time and the quantity of the charge component. This relationship can be essentially constant, or at least uniquely defined, over a predetermined exhaust gas back pressure range.

The exploitation of the relationship between the quantity of the charge component, in particular the residual gas quantity, and the exhaust gas back pressure at the predetermined point in time, in particular at the point in time when the exhaust valve and the intake valve are open, makes the method described robust against systematic and stochastic errors in a measured value acquisition by an exhaust back pressure sensor. Moreover, the fixed, predetermined relationship between the quantity of the charge component, in particular the residual gas quantity, and the exhaust gas back pressure at the predetermined point in time, in particular at the point in time when the exhaust valve and the intake valve are open, reduces computational effort and memory requirements for the calculation of the air mass in an engine control unit.

An intake manifold pressure can additionally be taken into account in determining the charge component. The intake manifold pressure can be measured in the air inlet, preferably adjacent to the intake valve, by a pressure sensor. For example, it is possible to determine a ratio between the intake manifold pressure and the exhaust gas back pressure at the predetermined point in time, in particular during the valve overlap. The quantity of the charge component can then be calculated on the basis of this ratio between the intake manifold pressure and the exhaust gas back pressure.

Because the ratio between the intake manifold pressure and the exhaust gas back pressure during the valve overlap is critical for the extent of the residual-gas overflow or residual-gas exhaustion, it is possible to determine the quantity of the charge component very accurately with the method according to the invention.

The quantity of the charge component can also be dependent on one or more state parameters of the internal combustion engine in addition to the exhaust gas back pressure and, if applicable, the intake manifold pressure. The state parameters can include a speed of the internal combustion engine, a position of one or more valve timing actuators, for example an intake camshaft phase, an exhaust camshaft phase, or another position, and/or one or more temperatures, for example an intake air temperature, an engine temperature, or an exhaust gas temperature. The accuracy of the determination of the quantity of the charge component can be further improved by taking into account the one or more state parameters.

The quantity of the charge component can be dependent on one or more design parameters of the internal combustion engine, for example on a volume of the cylinder of the internal combustion engine. The accuracy of the determination of the quantity of the charge component can be further improved in this way.

The method according to the invention can additionally include the receiving of a sensor signal with a high sampling rate in terms of time from a high-resolution exhaust back pressure sensor, wherein the sensor signal represents the exhaust gas back pressure. The sampling rate can be in the range from 0.5 kHz to 3,000 kHz, in particular in the range from 1 kHz to 1,000 kHz. The exhaust gas back pressure at the predetermined point in time can then be extracted from the sensor signal.

The use of the exhaust back pressure sensor in conjunction with a high sensor sampling rate in terms of time makes it possible to measure the instantaneous exhaust gas back pressure at different points in time during an operating cycle. In this way, it is possible, among other things, to determine the exhaust gas back pressure at the predetermined point in time, for example at the point in time when the exhaust valve and the intake valve are open. With the aid of this measured value, the residual gas quantity can be calculated when the corresponding cylinder volume and the exhaust gas temperature are known.

The method described above makes possible a very exact determination of the cylinder air charge or quantity of the charge component, in particular at operating points with high camshaft overlap and at high exhaust gas back pressures. In addition, the exploitation of the predetermined relationship between the quantity of the charge component, for example a cylinder air mass, and the exhaust gas back pressure at the predetermined point in time, in particular at the point in time when the intake valve is open, makes this method robust against systematic and stochastic errors in the measured value acquisition by the exhaust back pressure sensor. Moreover, the fixed, predetermined relationship between the cylinder air mass and the exhaust gas back pressure at the predetermined point in time reduces computational effort and memory requirements for the calculation of the cylinder air mass in the engine control unit.

The present invention also relates to a controller for determining a quantity of a charge component in a cylinder of an internal combustion engine, wherein the cylinder is connected by an intake valve to an air inlet, and by an exhaust valve to an exhaust duct. The controller is designed to receive an exhaust gas back pressure at a predetermined point in time during an operating cycle of the internal combustion engine when the exhaust valve is open, and to calculate, on the basis of the exhaust gas back pressure obtained, the quantity of the charge component at the predetermined point in time. The controller is designed, in particular, to carry out a method for determining a quantity of a charge component in a cylinder as described above.

The controller can have a processor, for example a microprocessor, that is designed to carry out the method described for determining a quantity of a charge component in a cylinder. The controller can additionally have a data memory, in which preferably a program is stored that contains instructions for the processor in order to control the latter in accordance with the method described. The predetermined relationship and/or predetermined parameters for carrying out the method described, for example the cylinder volume, can additionally be stored in the data memory.

The controller can have a number of signal inputs and signal outputs. For example, the exhaust gas back pressure, the intake manifold pressure, the state parameters of the internal combustion engine, and/or other signals can be received through the signal inputs. The quantity of the charge component, in particular, can be output through the signal outputs.

The controller can be integrated into an engine control unit of the motor vehicle. Alternatively, the controller can be designed as a separate unit.

The controller can include an exhaust back pressure sensor or be connectable to an exhaust back pressure sensor, for example through one of the signal inputs. The exhaust back pressure sensor in this case can be designed to output a sensor signal with a high sampling rate in terms of time that represents the exhaust gas back pressure. On the other hand, the controller can be designed to extract the exhaust gas back pressure at the predetermined point in time from the sensor signal.

The present invention also relates to a motor vehicle with an internal combustion engine and a controller for determining a quantity of a charge component in a cylinder of the internal combustion engine as described above. The internal combustion engine has a cylinder, an intake valve by which the cylinder is connected to an air inlet, and an exhaust valve by which the cylinder is connected to an exhaust duct. The internal combustion engine can be a gasoline engine, which preferably is controlled such that a valve overlap, in particular a high valve overlap, occurs. The internal combustion engine can be a diesel engine, which preferably can be operated with an extended variability in the valve timing and/or utilizes an internal exhaust gas recirculation.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
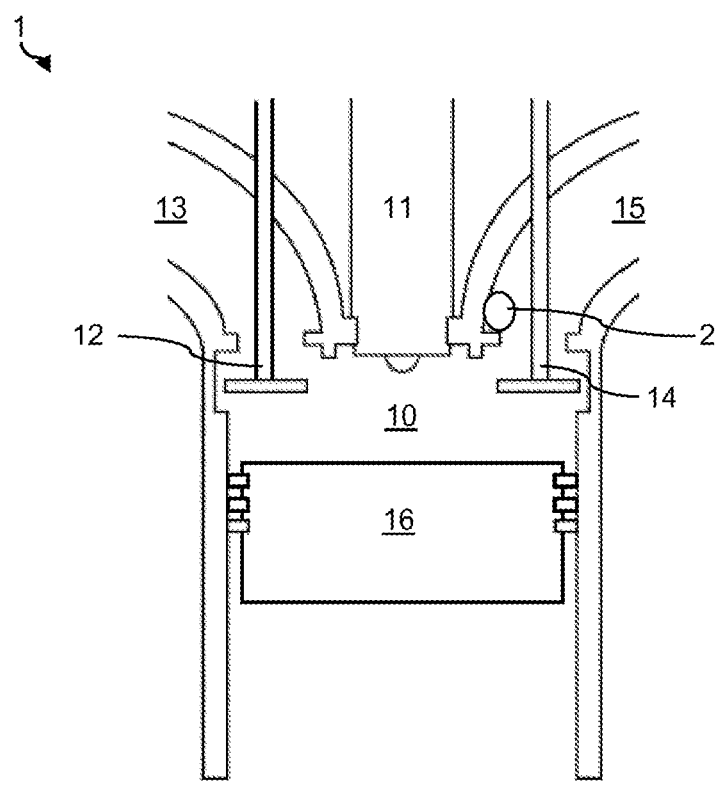
FIG. 1 schematically shows an exemplary embodiment of an internal combustion engine.

An exemplary embodiment of a cylinder 1 of an internal combustion engine is shown schematically in FIG. 1. The cylinder 1 has a combustion chamber 10, in which the combustion of fuel that is injected through an injection valve 11 takes place. The cylinder 1 is coupled by an intake valve 12 to an intake manifold 13, from which fresh air arrives in the combustion chamber 10 through the intake valve 12. In addition, the cylinder 1 is coupled by an exhaust valve 14 to an exhaust manifold 15, through which the exhaust gas or residual gas is directed out of the combustion chamber 10 into the exhaust manifold 15. Furthermore, a cylinder piston 16 is present that is driven by a crankshaft. Located in the exhaust manifold 15 directly behind the exhaust valve 14 is an exhaust back pressure sensor 2, which is designed to detect an exhaust gas back pressure with a high sampling rate in terms of time.

In FIG. 1, the cylinder 1 is represented at a point in time when the intake valve 12 and the exhaust valve 14 are open and a valve overlap is present.

Figure 2:
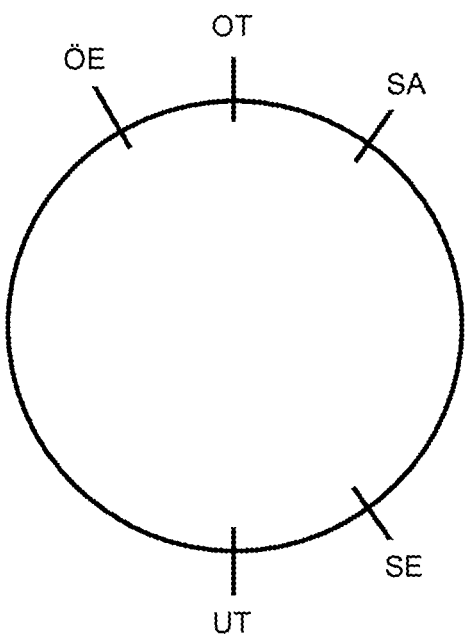
FIG. 2 shows a portion of a working cycle of the internal combustion engine.

FIG. 2 shows a portion of a working cycle of the internal combustion engine, which illustrates an opening time ÖE and a closing time SE of the intake valve 12 and a closing time SA of the exhaust valve 14 during intake. The working cycle of the internal combustion engine includes the intake of fresh air into the cylinder, the compression of the cylinder charge in the cylinder, the power or the combustion of fuel, and the exhausting of the exhaust gas or residual gas from the cylinder.

Shown in FIG. 2 is a circular sector on which is indicated a top dead center OT, at which the piston 16 of the internal combustion engine is in a position in which the cylinder volume is at a minimum, and a bottom dead center UT, at which the piston of the internal combustion engine is in a position in which the cylinder volume is at a maximum.

Intake occurs in a region between the top dead center OT and the bottom dead center UT along the right hand half of the circle. As is shown to the left of top dead center OT in FIG. 2, the intake valve of the internal combustion engine is opened at an opening time ÖE before the piston reaches the top dead center. A closing time SA of the exhaust valve 14 is located shortly after the piston 16 has passed through the top dead center OT. Shortly before the piston reaches the bottom dead center UT, the intake valve 12 also closes, which is shown as closing time SE in FIG. 2.

The exhaust back pressure sensor 2 is connected to an engine control unit, which is designed to carry out a method for determining a residual gas mass in the cylinder, as described below with reference to FIG. 3. The engine control unit can then control the injection valve 11 on the basis of the residual gas mass determined.

Figure 3:
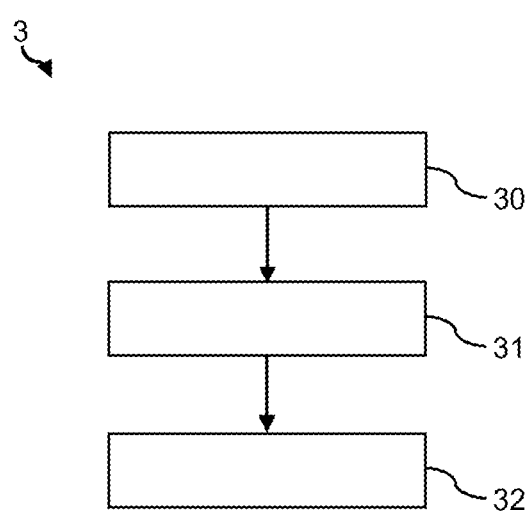
FIG. 3 shows a flowchart of a method according to the invention for determining a quantity of a charge component in a cylinder of the internal combustion engine from FIG. 1.

FIG. 3 shows a flowchart 3 of a method for determining a residual gas mass in the cylinder 1 from FIG. 1.

At 30, a sensor signal representing the exhaust gas back pressure is received from the high-resolution exhaust back pressure sensor. The exhaust back pressure sensor is designed to measure the exhaust gas back pressure with a high sampling rate in terms of time. The sensor signal thus provides values for the exhaust gas back pressure for a multiplicity of points in time of the working cycle of the internal combustion engine.

At 31, an exhaust gas back pressure is extracted from the sensor signal at a predetermined point in time during an operating cycle of the internal combustion engine in the range from the opening time of the intake valve to the closing time of the exhaust valve. The predetermined point in time is a point in time when the intake valve and the exhaust valve are at least partially open.

At 32, a residual gas mass is calculated on the basis of the exhaust gas back pressure obtained at the predetermined point in time. The calculation takes place with the aid of a fixed, predetermined relationship between the residual gas mass and the exhaust gas back pressure at the predetermined point in time. In this way, the cylinder charge as a whole can be determined very exactly.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for determining a quantity of a charge component in a cylinder of an internal combustion engine, the quantity of the charge component including a residual gas quantity, a fresh air quantity, and/or a scavenging air quantity, wherein the cylinder is connected by an intake valve to an air inlet and by an exhaust valve to an exhaust duct, the method comprising:
    obtaining an exhaust gas back pressure at a predetermined point in time during an operating cycle of the internal combustion engine when both the intake valve and the exhaust valve are open; and
    calculating the quantity of the charge component at the predetermined point in time based on the exhaust gas back pressure obtained.

2. The method according to claim 1, wherein there is a predetermined relationship between the exhaust gas back pressure at the predetermined point in time and the quantity of the charge component.

3. The method according to claim 1, wherein the quantity of the charge component is additionally dependent on a state parameter of the internal combustion engine.

4. The method according to claim 1, wherein the quantity of the charge component is additionally dependent on a design parameter of the internal combustion engine.

5. The method according to claim 1, further comprising :
    receiving a sensor signal with a high sampling rate in terms of time representing the exhaust gas back pressure from a high-resolution exhaust back pressure sensor,
    wherein the exhaust gas back pressure at the predetermined point in time is extracted from the sensor signal.

6. A controller for determining a quantity of a charge component in a cylinder of an internal combustion engine, wherein the controller is configured to carry out the method for determining a quantity of a charge component in a cylinder according to claim 1.

7. The controller according to claim 6, wherein the controller includes an exhaust back pressure sensor or is connectable to an exhaust back pressure sensor, wherein the exhaust back pressure sensor is designed to output a sensor signal with a high sampling rate in terms of time that represents the exhaust gas back pressure.

8. A motor vehicle comprising:
    an internal combustion engine that includes a cylinder, an intake valve via which the cylinder is connected to an air inlet, and an exhaust valve via which the cylinder is connected to an exhaust duct; and
    a controller for determining a quantity of a charge component in the cylinder of the internal combustion engine according to claim 6.

* * * * *